United States Patent Office 3,305,566
Patented Feb. 21, 1967

3,305,566
16-METHYL-6α,9α-DIHALO-21-DESOXY CORTICOIDS
Howard J. Ringold and Carl Djerassi, Mexico City, Mexico, assignors, by mesne assignments, to Syntex Corporation, a corporation of Panama
No Drawing. Filed Apr. 28, 1960, Ser. No. 25,198
Claims priority, application Mexico, May 18, 1959, 54,598
9 Claims. (Cl. 260—397.45)

The present invention relates to novel cyclopentanophenanthrene derivatives.

More particularly, the present invention relates to new derivatives of Δ⁴-pregnen-17α-ol-3,20-dione having in its molecule a halogen atom such as chlorine or fluorine at C–9α and at C–6, an oxygen function such as keto or β-hydroxy at C–11, and an α-methyl or β-methyl group at C–16. Moreover, there may be present in the molecule double bonds at C–1,2 and/or C–6,7.

These new compounds show a strong anti-inflammatory effect, particularly on topical administration, and are represented by the following general formulas:

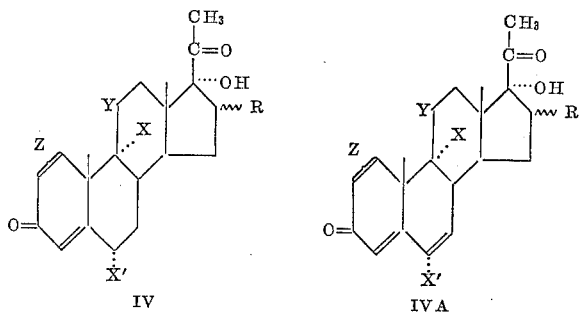

In the above formulas, Z indicates a saturated linkage or a double bond between C–1 and C–2; X and X′ represent chlorine or fluorine; Y represents keto or β-hydroxy; and R is a methyl group in α or β steric configuration.

The new compounds IV of this invention wherein X′ is fluorine may be prepared by a process illustrated by the following reaction diagram:

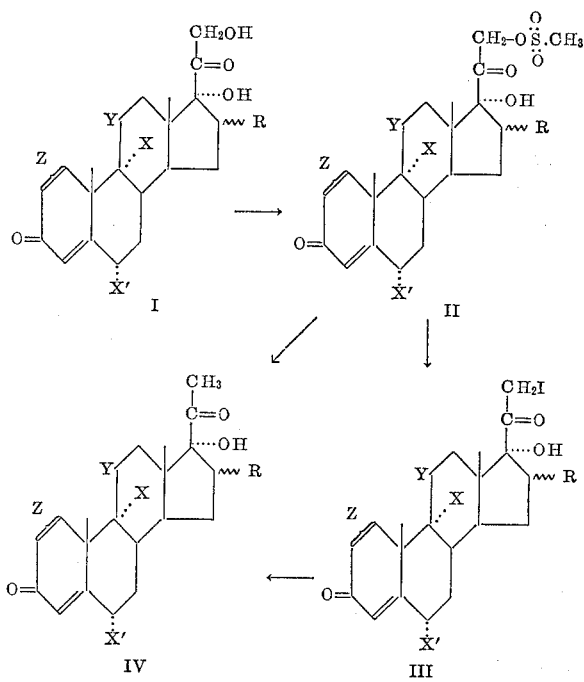

When a 6-dehydro or 1,6-bis-dehydro compound is utilized as the starting material, the following equation serves to illustrate the course of the reaction:

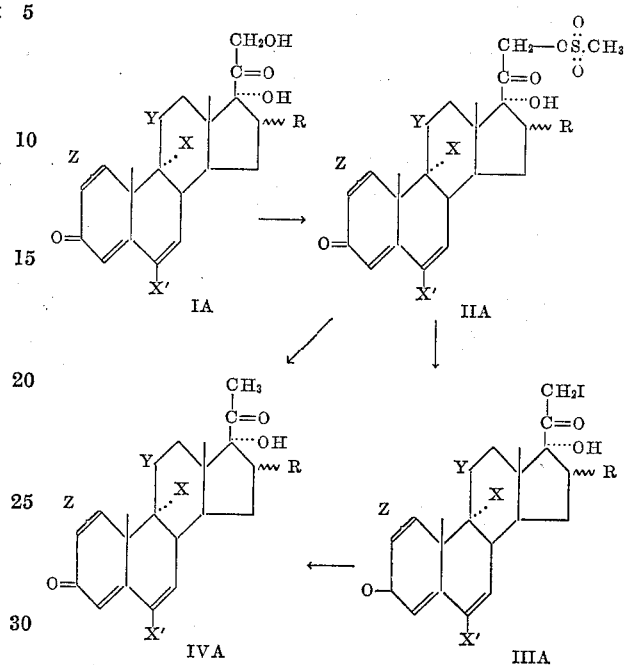

In these reactions Z, X, X′, Y and R have the same significance as hereinabove set forth.

For transforming the 17-ketol side chain of such starting compounds into the 17β-acetyl group, that is, for producing the desired final compounds, there was first formed the 21-mesylate (II) by reaction with methanesulfonyl chloride in pyridine; the mesylate group was then substituted by iodine by reaction with sodium iodide in mixture with acetone, and finally the resulting 21-iodo-compound (III) was transformed into the 17β-acetyl-compound (IV) by refluxing with sodium bisulfite in mixture with aqueous methanol, or by reaction with chromous chloride in acetone.

However where the starting compounds contained the 6-chloro-Δ⁴-3-keto-grouping, it was necessary to protect the chlorine atom at C–6 prior to transformation of the 17β-ketol side chain into the 17β-acetyl group. This was accomplished by reacting the 6(α or β)- chloro-9α-halo- (chloro or fluoro)-11-(keto or β-hydroxy)-16(α or β)-methyl - Δ⁴ - pregnene - 17α,21 - diol - 3,20 - diones 21-acetate with ethyl orthoformate for 1 hour at room temperature in a solvent such as dioxane and in the presence of p-toluenesulfonic acid to form the 3-ethyl enol ether derivative. The ester group at C–21 was hydrolyzed as by treatment with 1% methanolic potassium hydroxide at 0° C. and the resulting 21-hydroxy compound was then transformed sequentially into the 21-mesylate, the 21-iodo and finally into the 21-desoxy compound as hereinabove set forth. Upon subsequent treatment with a mineral acid, such as dilute hydrochloric acid in acetic acid, at room temperature, the enol ether group was hydrolyzed to regenerate the Δ⁴-3-keto group, thus affording the corresponding 6α-chloro-9α-halo (fluoro or chloro)-16 (α or β)-methyl-Δ⁴-pregnene compound. A double bond may then be introduced at C–1,2 by refluxing with selenium dioxide, preferably in tertiary butanol, in the presence of pyridine and under an atmosphere of nitrogen for 48 hours, or a double bond may then be introduced at C–6,7 by refluxing with chloranil preferably in mixture with ethyl acetate and acetic acid or in mixture with xylene or tertiary butyl alcohol. By a combination of these methods or by refluxing the $\Delta^4$ compound with chloranil in n-amyl alcohol, there was obtained the $\Delta^{1,4,6}$-trienes.

Protection of the chlorine atom at C–6 was not necessary when the 6-dehydro or 1,6-bisdehydro compound served as the starting compound.

Thus the preparation of the novel compounds IV of the present invention wherein X' is chlorine may be illustrated by the following reaction equation:

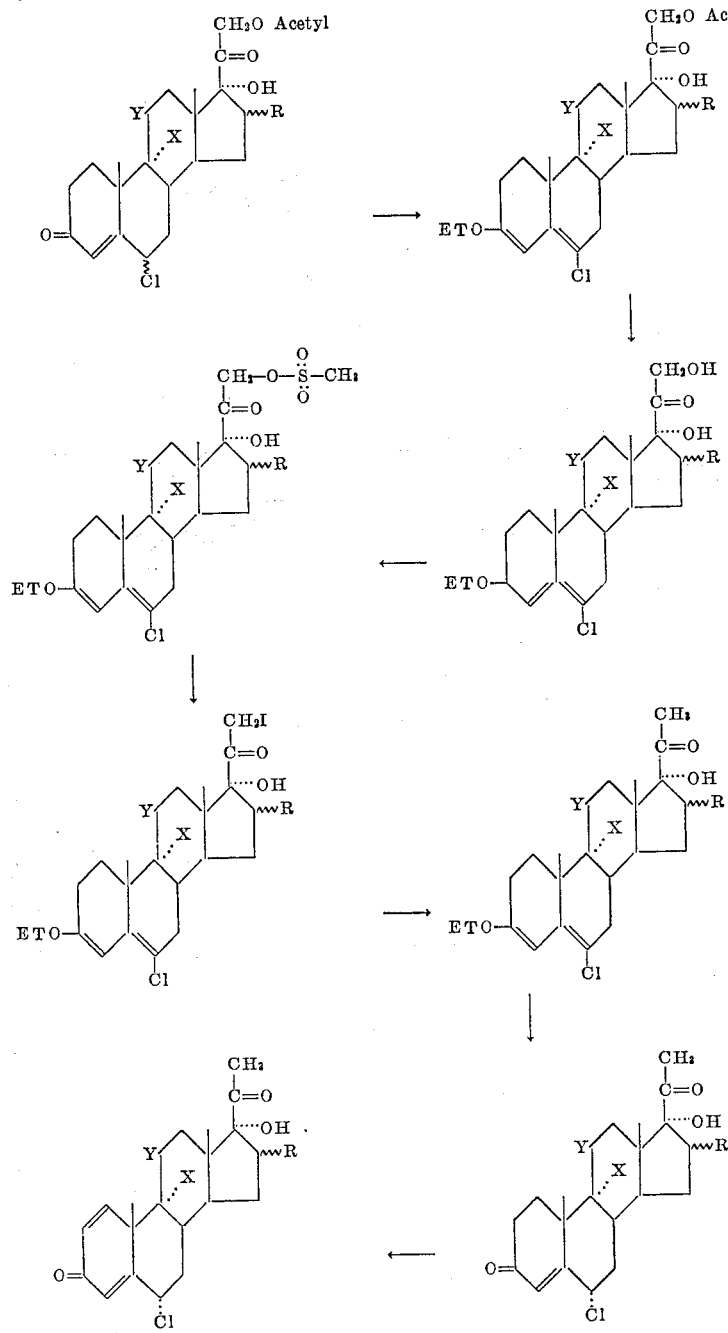

In practicing the process according to the above reaction equations, there were used as starting materials the 6-halo (fluoro or chloro)-9α-halo (chloro or fluoro)-11-(keto or β-hydroxy) 16(α or β)-methyl-$\Delta^4$-pregnene-17α, 21-diol-3,20-diones and their 1-dehydro, 6-dehydro and 1,6-bisdehydro derivatives, as hereinafter more fully described.

The reactions may be modified within wide limits both with respect to the reagents and solvents employed as with respect to the conditions of temperature and time.

Thus for example, instead of the 21-mesylate, there was prepared the 21-tosylate; a 21-alkyl (aryl)-sulfonate may be converted in only one step into the desired 21-desoxy compound by refluxing with sodium iodide in mixture with acetic acid.

The following examples serve to illustrate but are not intended to limit the scope of the invention:

*Example I*

A solution of 5 g. of 16α-methyl-6α,9α-difluoro-cortisone described in copending application Serial No. 789,242 filed on January 27, 1959, in 100 cc. of a mixture of pyridine and chloroform (9:1) was cooled to 0° C. Under stirring there was added batchwise 1.3 g. of methanesulfonyl chloride, the mixture was kept for 14 hours at 0° C., diluted with 100 cc. of chloroform, washed with dilute hydrochloric acid, water, aqueous sodium bicarbonate solution and again with water, dried over anhydrous sodium sulfate and the solvent was evaporated under reduced pressure. Thus there was obtained the crude 21-mesylate of 16α-methyl-6α,9α-difluoro-cortisone.

A solution of the crude compound in 200 cc. of acetone was treated with 3 g. of sodium iodide and refluxed for 2 hours. Most of the acetone was removed by distillation, the residue was diluted with water and the precipitate formed was collected by filtration, washed with water and dried under vacuum. There was thus obtained crude 16α - methyl-6α,9α-difluoro-21-iodo-$\Delta^4$-pregnen-17α-ol-3,11,20-trione.

To a solution of this iodo-compound in 200 cc. of methanol and 20 cc. of water was added 5 g. of sodium bisulfite and the mixture was refluxed for 2 hours. Most of the methanol was removed by distillation under reduced pressure, the residue was diluted with water and the precipitate was collected, washed with water, dried and recrystallized from acetone-hexane. There was thus obtained 16α - methyl-6α,9α-difluoro-$\Delta^4$-pregnen-17α-ol-3,11,20-trione.

Example II

By the method of Example I, but employing p-toluenesulfonyl chloride instead of methanesulfonyl chloride, there was prepared the 21-tosylate of 16α-methyl-6α,9α-difluoro-cortisone.

A solution of 2.5 g. of the above compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane there was obtained 16α - methyl-6α,9α-difluoro-$\Delta^4$-pregnen-17α-ol-3,11,20-trione, identical with the one prepared in accordance with Example I.

Example III

A mixture of 5 g. of 16α-methyl-6α,9α-difluoro-cortisone 21-acetate, 8 g. of chloranil and 200 cc. of xylene was refluxed for 12 hours, cooled and diluted with ether. The solution was washed with water, 5% sodium carbonate solution and again with water to neutral, dried over anhydrous sodium sulfate and evaporated to dryness under reduced pressure. By chromatography of the residue on neutral alumina there was obtained 16α-methyl-6,9α-difluoro-6-dehydro-cortisone 21-acetate.

A suspension of 1 g. of 16α-methyl-6,9α-difluoro-6-dehydro-cortisone 21-acetate in 10 cc. of absolute methanol was treated with 10 cc. of a solution of sodium methoxide in absolute methanol (prepared by dissolving 60 mg. of sodium metal in 10 cc. of absolute methanol), with stirring, under an atmosphere of nitrogen, at 0° C. for 1 hour. After precipitating with saturated aqueous sodium chloride solution containing a few drops of acetic acid, the product was filtered, and recrystallized from acetone-hexane, thus affording the free 16α-methyl-6,9α-difluoro-6-dehydro-cortisone.

In accordance with the methods of Examples I and II, the 16α-methyl-6,9α-difluoro-6-dehydro-cortisone was converted into 16α-methyl-6,9α-difluoro-$\Delta^{4,6}$-pregnadien-17α-ol-3,11,20-trione.

A mixture of 2.0 g. of the latter compound, 100 cc. of t-butanol, 300 mg. of selenium dioxide and 0.2 cc. of pyridine was refluxed under an atmosphere of nitrogen for 48 hours, filtered through celite and the filtrate was evaporated to dryness under reduced pressure. The residue was refluxed for 1 hour with decolorizing charcoal in acetone, filtered from the charcoal and the filtrate was evaporated to dryness. Chromatography of the residue on washed alumina yielded 16α-methyl-6,9α-difluoro-$\Delta^{1,4,6}$-pregnatrien-17α-ol-3,11,20-trione.

Example IV

In accordance with the methods described in Examples I and II, 16α-methyl-6α-fluoro-9α-chloro-cortisone, 16α-methyl-6α-fluoro-9α-chloro-hydrocortisone, 16α - methyl-6α-fluoro-9α-chloro-prednisone, 16α-methyl-6α-fluoro-9α-chloro-prednisolone, 16α - methyl - 6α,9α-difluoro-hydrocortisone, 16α-methyl-6α,9α-difluoro-prednisolone, and 16α-methyl-6α,9α-difluoro-prednisone, described in copending application Serial No. 789,242, filed on January 27, 1959, were converted into the corresponding 21-desoxy compounds, i.e., 16α-methyl-6α-fluoro-9α-chloro-$\Delta^4$-pregnene-17α-ol-3,11,20-trione; 16α-methyl-6α-fluoro-9α-chloro-$\Delta^4$-pregnene-11β,17α - diol - 3,20 - dione; 16α-methyl-6α-fluoro-9α-chloro-$\Delta^{1,4}$-pregnadien-17α - ol - 3,11,20-trione; 16α - methyl-6α-fluoro-9α-chloro-$\Delta^{1,4}$-pregnadiene-11β,17α-diol-3,20-dione; 16α - methyl-6α,9α-difluoro-$\Delta^4$-pregnene-11β,17α-diol-3,20-dione; 16α - methyl-6α,9α-difluoro-$\Delta^{1,4}$-pregnene-11β,17α-diol-3,20-dione and 16α-methyl-6α,9α-difluoro-$\Delta^{1,4}$-pregnadien-17α - ol - 3,11,20-trione.

Example V

In accordance with the method of Example III, 16α-methyl-6α,9α-difluoro-hydrocortisone, 16α-methyl-6α,9α-difluoro-prednisone, 16α-methyl-6α,9α-difluoro-prednisolone, 16α-methyl-6α-fluoro-9α-chloro-cortisone, 16α-methyl-6α-fluoro-9α-chloro-hydrocortisone, 16α - methyl - 6α-fluoro-9α-chloro-prednisone and 16α-methyl-6α-fluoro-9α-chloro-prednisolone were converted into the corresponding 6-fluoro-6-dehydro compounds and then by the methods described in Examples I and II were finally converted into the corresponding 21-desoxy-compounds, i.e., 16α-methyl-6,9α-difluoro-$\Delta^{4,6}$-pregnadiene-11β,17α-diol - 3,20-dione, 16α-methyl-6,9α-difluoro-$\Delta^{1,4,6}$-pregnatrien-17α-ol-3,11,20-trione (identical with the one produced in Example III), 16α-methyl-6,9α-difluoro-$\Delta^{1,4,6}$-pregnatriene-11β,17α-diol-3,20-dione, 16α - methyl-6-fluoro-9α-chloro-$\Delta^{4,6}$-pregnadien-17β-ol-3,11,20-trione, 16α-methyl-6-fluoro-9α-chloro-$\Delta^{4,6}$-pregnadiene-11β,17α-diol-3,20 - dione, 16α-methyl - 6 - fluoro-9α-chloro-$\Delta^{1,4,6}$-pregnatrien-17α-ol-3,11,20-trione and 16α-methyl-6-fluoro-9α-chloro-$\Delta^{1,4,6}$-11β,17α-diol-3,20-dione.

Example VI

A mixture of 5 g. of the 21-acetate of 16α-methyl-6α-chloro-9α-fluoro-cortisone, described in our copending application Serial No. 825,665, filed on July 8, 1959, now abandoned, 5 cc. of ethyl orthoformate, 50 cc. of dioxane and 500 mg. of p-toluenesulfonic acid monohydrate was stirred at room temperature for 1 hour; 50 cc. of pyridine was then added followed by the portionwise addition of ice water, under stirring and until complete precipitation of the reaction product. The mixture was kept in the refrigerator for 2 hours and the precipitate was collected by filtration, washed with water, dried and recrystallized from acetone-hexane; there were thus obtained 16α-methyl - 6-chloro-9α-fluoro-3-ethoxy-21-acetoxy-$\Delta^{3,5}$-pregnadien-17α-ol-11,20-dione, namely the 3-ethyl-enol ether of the 21-acetate of 16α-methyl-6-chloro-9α-fluoro-cortisone.

In order to obtain the enol ether compound with the free 21-hydroxyl group, the steroid was treated with 1% methanolic potassium hydroxide solution for 1 hour at 0° C. and under an atmosphere of nitrogen, using 50 cc. of the methanolic potassium hydroxide solution for 1 g. of the steroid. The mixture was then neutralized with acetic acid, concentrated under reduced pressure, diluted with water and the precipitate was collected by filtration and purified by recrystallization from acetone-hexane.

A solution of 5 g. of 16α-methyl-6-chloro-9α-fluoro-3-ethoxy-$\Delta^{3,5}$-pregnadiene-17α,21-diol-11,20-dione in 50 cc. of pyridine was treated with 3 cc. of methanesulfonyl chloride at 0° C. and kept overnight at this temperature, then poured into ice water and the precipitate was collected, washed with water and dried. There was thus obtained the 21-mesylate of 16α-methyl-6-chloro-9α-fluoro - 3 - ethoxy-$\Delta^{3,5}$-pregnadiene-17α,21-diol-11,20-dione, which was used for the next step without further purification.

7

A solution of the above compound in 200 cc. of acetone was mixed with 3 g. of sodium iodide and refluxed for 2 hours. Most of the acetone was then removed by distillation, the residue was diluted with water and the precipitate was collected, washed with water and dried. There was thus obtained 16α-methyl-6-chloro-9α-fluoro-21-iodo-3-ethoxy-$\Delta^{3,5}$-pregnadien-17α-ol - 11,20 - dione in crude form, which was dissolved in 200 cc. of methanol and 20 cc. of water; 5 cc. of sodium bisulfite was added and the mixture was refluxed for 2 hours. Most of the methanol was removed by distillation under reduced pressure, the residue was diluted with water and the precipitate was collected, washed with water and then treated with 2 cc. of concentrated hydrochloric acid in 200 cc. of glacial acetic acid, kept at room temperature for 2 hours and diluted with ice-water. There was thus obtained 16α - methyl-6α-chloro-9α-fluoro-$\Delta^4$-pregnene-17α-ol-3,11,20-trione which was purified by recrystallization from acetone-hexane.

A mixture of 1 g. of the above compound, 2 g. of chloranil, 25 cc. of ethyl acetate and 5 cc. of glacial acetic acid was refluxed under an atmosphere of nitrogen for 72 hours; the cooled mixture was washed with aqueous 10% sodium hydroxide solution until the washings were colorless, dried over anhydrous sodium sulfate and the ethyl acetate was evaporated. Chromatography of the residue on neutral alumina yielded 16α-methyl-6-chloro-9α-fluoro-$\Delta^{4,6}$-pregnadiene-17α-ol-3,11,20-trione.

A mixture of 500 mg. of the above compound, 300 mg. of selenium dioxide, 20 cc. of t-butanol and a few drops of pyridine was refluxed for 18 hours under an atmosphere of nitrogen and then filtered through celite and diluted with water; the precipitate was collected, washed with water, dried and purified by chromatography on neutral alumina. There was thus obtained 16α-methyl-6-chloro-9α-fluoro-$\Delta^{1,4,6}$-pregnatrien-17α-ol-3,11,20-trione.

1 g. of 16α-methyl-6α-chloro-9α-fluoro-$\Delta^4$-pregnen-17α-ol-3,11,20-trione (see above) was subjected to the method of dehydrogenation with selenium dioxide described above, to produce 16α-methyl-6α-chloro-9α-fluoro-$\Delta^{1,4}$-pregnadiene-17α-ol-3,11,20-trione which was then subjected to the reaction with chloranil described above, to furnish finally 16α-methyl-6-chloro-9α-fluoro-$\Delta^{1,4,6}$-pregnatrien-17α-ol-3,11,20-trione, identical with the one produced by dehydrogenation of the $\Delta^4$-compound at C–6,7 and then at C–1,2.

*Example VII*

In accordance with the method described in the preceding example, there were prepared the 21-acetates of the 3-ethyl enol ethers of 16α-methyl-6-chloro-9α-fluoro-hydrocortisone, 16α-methyl-6,9α-dichloro - cortisone and 16α-methyl - 6,9α - dichloro-hydrocortisone (disclosed in our copending application Serial No. 825,665), which were converted into the free C–21 alcohols and subsequently into the corresponding 16α-methyl-6α-chloro-9α-fluoro-$\Delta^4$-pregnene-11β,17α-diol-3,20-dione, 16α - methyl-6α,9α-dichloro$\Delta^4$-pregnen-17α-ol-3,11,20-trione and 16α-methyl - 6α,9α - dichloro-$\Delta^4$-pregnene-11β,17α-diol-3,20-dione.

By treatment with selenium dioxide as set forth in the preceding example, the latter compounds were transformed into the corresponding 1-dehydro compounds, which upon future treatment with chloranil as set forth in the preceding example were converted into the corresponding 1,6-bisdehydro compounds, i.e., 16α-methyl-6-chloro-9α-fluoro-$\Delta^{1,4,6}$-pregnatriene-11β,17α - diol - 3,20-dione, 16α-methyl-6,9α-dichloro-$\Delta^{1,4,6}$-pregnatrien-17α-ol-3,11,20-trione, and 16α-methyl-6,9α-dichloro-$\Delta^{1,4,6}$-pregnatriene-11β,17α-diol-3,20-dione.

The 6-dehydro compounds of 16α-methyl-6α-chloro-9α-fluoro-$\Delta^4$-pregnene-11β,17α-diol - 3,20 - dione, of 16α-methyl-6α,9α-dichloro-$\Delta^4$-pregnen - 17α - ol-3,11,20-trione and of 16α-methyl-6α,9α-dichloro-$\Delta^4$-pregnene - 11β,17α-

8 diol-3,20-dione were prepared in accordance with the method described in the preceding example.

*Example VIII*

In accordance with the method described in Example VI, 16β-methyl-6α-chloro-9α-fluoro-cortisone, 16β-methyl-6α-chloro - 9α - fluoro-hydrocortisone, 16β-methyl-6α,9α-dichloro-cortisone and 16β-methyl-6α,9α-dichloro-hydrocortisone described in copending applications Serial No. 824,200, filed July 1, 1959, now abandoned, and Serial No. 826,120 filed July 10, 1959 were converted by the method described in such example into the corresponding 21-desoxy compounds, i.e., 16β-methyl-6α-chloro-9α-fluoro-$\Delta^4$-pregnen-17α-ol-3,11,20-trione, 16β - methyl-6α-chloro - 9α - fluoro-$\Delta^4$-pregnene-11β,17α-diol-3,20-dione, 16β-methyl-6α,9α-dichloro-$\Delta^4$-pregnen - 17α - ol-3,11,20-trione and 16β - methyl-6α,9α-dichloro-$\Delta^4$-pregnene-11β,17α-diol-3,20-dione, and finally into their 6-dehydro, 1-dehydro and 1,6-bisdehydro derivatives.

*Example IX*

By substituting 16β-methyl-6α-fluoro-9α-halo (fluoro or chloro) cortisone, 16β-methyl-6α-fluoro-9α-halo (fluoro or chloro)-hydrocortisone, 16β-methyl-6α-fluoro-9α-halo (fluoro or chloro) prednisone, 16β-methyl-6α-fluoro-9α-halo (fluoro or chloro) prednisolone, disclosed in copending application Serial No. 792,962, filed on February 13, 1959, now abandoned, and the 6-dehydro derivatives of the foregoing compounds, disclosed in copending application Serial No. 826,120 filed on July 10, 1959, for the starting material of Examples I and II, there were obtained the corresponding 21-desoxy compounds such as 16β-methyl-6α-fluoro-9α-chloro-$\Delta^4$-pregnen-17α-ol-3,11,20-trione, 16β-methyl-6α-fluoro - 9α - chloro-$\Delta^4$-pregnene-11β,17α-diol-3,20 - dione, 16β-methyl-6α-fluoro-9α-chloro-$\Delta^{1,4}$-pregnadien - 17α - ol - 3,11,20-trione, 16β-methyl - 6α - fluoro-9α-chloro-$\Delta^{1,4}$-pregnadiene-11β,17α-diol-3,20-dione, 16β-methyl-6-fluoro-9α-chloro-$\Delta^{4,6}$-pregnadien-17α-ol-3,11,20-trione, 16β-methyl - 6 - fluoro-9α-chloro-$\Delta^{4,6}$-pregnadiene - 11β,17α - diol-3,20-dione, 16β-methyl-6-fluoro - 9α - chloro - $\Delta^{1,4,6}$-pregnatrien-17α-ol-3,11,20-trione, 16β-methyl-6-fluoro-9α-chloro - $\Delta^{1,4,6}$ - pregnatriene-11β,17α-diol-3,20-dione and the corresponding derivatives of the 6α,9α-difluoro compounds, such as 16β-methyl-6α,9α-difluoro-$\Delta^4$-pregnen - 17α-ol-3,11,20-trione; 16β - methyl - 6α,9α - difluoro-$\Delta^4$-pregnene-11β,17α-diol-3,20-dione; 16β-methyl - 6α,9α - difluoro-$\Delta^{1,4}$-pregnadien-17α-ol - 3,11,20 - trione, 16β-methyl-6α,9α-difluoro-$\Delta^{1,4}$-pregnadiene-11β,17α-diol-3,20-dione; 16β - methyl - 6,9α-difluoro-$\Delta^{4,6}$-pregnadien-17α-ol-3,11,20 - trione, 16β-methyl-6,9α-difluoro-$\Delta^{4,6}$-pregnadiene - 11β,17α - diol - 3,20-dione, 16β-methyl-6,9α-difluoro-$\Delta^{1,4,6}$-pregnatrien-17α-ol-3,11,20 - trione and 16β-methyl-6,9α-difluoro-$\Delta^{1,4,6}$-pregnatriene-11β,17α-diol-3,20-dione.

We claim:

1. A compound of the formula:

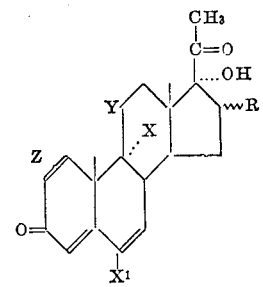

wherein R is selected from the group consisting of α-methyl and β-methyl; X and X' are each selected from the group consisting of chlorine and fluorine; Y is selected from the group consisting of =O and

and Z is selected from the group consisting of a double bond between C–1 and C–2 and a saturated linkage between C–1 and C–2.

2. 16β-methyl-6,9α-difluoro-Δ$^{4,6}$-pregnadien-17α-ol-3,11,20-trione.

3. 16α-methyl-6-chloro-9α-fluoro-Δ$^{4,6}$-pregnadiene-11β,17α-diol-3,20-dione.

4. 16β-methyl-6-fluoro-9α-chloro-Δ$^{4,6}$-pregnadiene-11β,17α-diol-3,20-dione.

5. 16β-methyl-6-fluoro-9α-chloro-Δ$^{1,4,6}$-pregnatrien-17α-ol-3,11,20-trione.

6. 16α-methyl-6,9α-difluoro-Δ$^{1,4,6}$-pregnatriene-11β,17α-diol-3,20-dione.

7. 16α-methyl-6,9α-dichloro-Δ$^{1,4,6}$-pregnatrien-17α-ol-3,11,20-trione.

8. 16α-methyl-6-chloro-9α-fluoro-Δ$^{1,4,6}$-pregnatriene-11β,17α-diol-3,20-dione.

9. A compound selected from the group consisting of those having the formula:

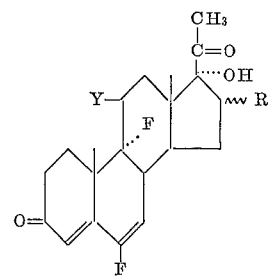

and the 1-dehydro derivatives thereof, wherein R is selected from the group consisting of αCH$_3$ and βCH$_3$ and Y is selected from the group consisting of =O and β—OH.

References Cited by the Examiner
UNITED STATES PATENTS
2,838,536  6/1958  Magerlein et al. ___ 260—397.45
2,838,538  6/1958  Spero et al. _____ 260—397.45

LEWIS GOTTS, *Primary Examiner.*

LESLIE H. GASTON, MORRIS LIEBMAN, *Examiners.*

H. A. FRENCH, *Assistant Examiner.*